N. L. LARSON.
CHUTE ATTACHMENT FOR CORN SHELLERS.
APPLICATION FILED NOV. 13, 1911.
1,021,201.
Patented Mar. 26, 1912.
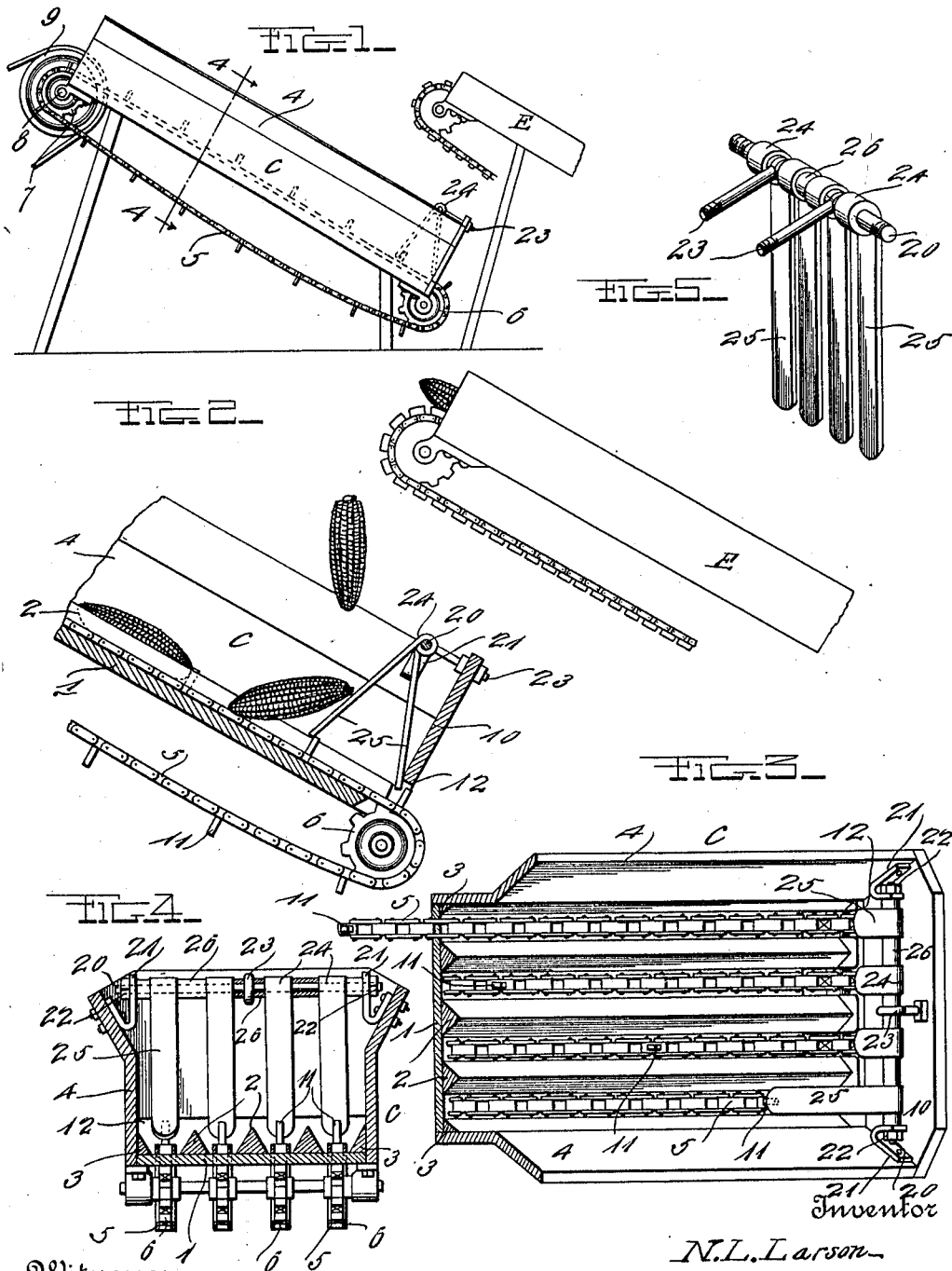

UNITED STATES PATENT OFFICE.

NELS L. LARSON, OF VILLISCA, IOWA.

CHUTE ATTACHMENT FOR CORN-SHELLERS.

1,021,201.   Specification of Letters Patent.   Patented Mar. 26, 1912.

Application filed November 13, 1911. Serial No. 659,954.

*To all whom it may concern:*

Be it known that I, NELS L. LARSON, a citizen of the United States, residing at Villisca, in the county of Montgomery and State of Iowa, have invented certain new and useful Improvements in Chute Attachments for Corn-Shellers; and I do declare the following to be a full, clear, and exact description of the invention, such as will enable others skilled in the art to which it appertains to make and use the same.

This invention relates to conveyers, and more especially to endless belt feeders; and the object of the same is to produce an agitator to prevent the choking up of the material in a feed chute. This and other objects are carried out by the construction hereinafter more fully described and claimed, and illustrated in the drawings wherein—

Figure 1 is a side elevation of a feed chute for corn shellers, disposed below the outlet end of an elevator, illustrating more particularly the means for driving the agitator comprising the gist of my present invention; Fig. 2 is an enlarged longitudinal section through the lower end of said feed chute, and Fig. 3 is a plan view of the same; Fig. 4 is a cross section on the line 4—4 of Fig. 1; and Fig. 5 is a perspective detail of the shifting bars and their support.

In the drawings the letter E designates broadly an elevator or carrier whose trunk is ordinarily disposed alongside a corn crib or in some other position where the ears of corn can be fed into it, and whose moving apron or belt conveys the ears of corn to the point where they are to be fed to the corn shelling mechanism not shown.

The letter C in the present instance designates broadly the feed chute which is shown as receiving the ears of corn from the elevator E and which it is to be understood will deliver them one by one to the proper holes in the corn shelling mechanism. This chute in the present instance is shown as having a corrugated bottom made up of a flat board 1, three parallel triangular ribs 2 rising therefrom, and beveled pieces 3 along the corners of the trunk which is composed of said bottom and the upright sides 4; and in the grooves of said corrugations move four endless chains 5 which pass over sprocket wheels 6 at the lower end of the trunk and 7 at the upper end thereof, the latter in the present instance being mounted on a shaft 8 and driven from a power wheel 9, although any suitable means may be employed for imparting power to these chains. The lower end of said chute is closed by an upright board 10 extending across between and connecting the sides 4. It is quite common, also, to form pins or lugs 11 on certain links of the chains and to dispose those on one chain in staggered or alternated relation to those on the other chain as seen in Fig. 3 and when power is imparted to the wheel 9 these pins travel around the lower sprocket wheels 6, pass upward through openings 12 in the lower end board 10, and travel upward along the grooves of the corrugations so that the ears of corn are delivered one by one and endwise to the sheller holes. I have found by experience, however, that when the ears are fed too rapidly into the chute, as by being thrown thereinto or supplied too rapidly by the elevator E, the ears accumulate in numbers at the lower end of the feed chute against its end wall 10 and between its sides 4 and the pins 11 either move upward along the grooves in the chute without taking any ears with them or else as is sometimes the case move upward and carry too many ears, so that the corn shelling mechanism in either event is not supplied regularly and steadily with material upon which to work. Also when the ears accumulate in the chute, the extra weight and friction of the swiftly moving chains often cause the parts to break, in which event the mechanism must be stopped for repairs and loss of time is occasioned to both the operator and proprietor. I have therefore devised an agitator intended to be placed in the lower end of the chute and actuated or operated automatically by the pins on the chains therein, and the details of its construction will now be described.

The numeral 20 designates a pivotal support which in the present instance is a bolt whose ends are passed through brackets 21 carried by the side walls 4 and threaded to receive nuts 22, and whose center may be supported by any suitable means as by an eye bolt 23 carried by the end board 10; and on this support are pivotally mounted the eyes 24 at the upper extremities of a series of shifting bars 25, here shown as pendant flat fingers of strap metal projecting integrally downward from the eyes 24. There are as many of said bars 25 as there are grooves in the feed chute, and the eyes 24 are separated by collars 26 strung on the support 20 and so disposed in conjunction with the eye bolt 23 (or several such bolts as shown in Fig. 5) that the bars stand directly above the corrugations and their lower extremities in position to be struck by the pins 11 on the chains 5.

The operation of this device will now be readily understood. Ears of corn raised by the elevator E fall into the chute C as seen in Fig. 2, and if they be not delivered too rapidly by said elevator they are picked up by the pins in the chains and carried along the chute to the corn shelling mechanism; but each time a pin passes around its sprocket wheel 6 and moves through the opening 12, it strikes behind or beneath the lower end of one of the bars 25 which hangs in its path and said bar is moved upward out of its pendant position, while the other bars retain such position because the pins are arranged in staggered relation on the several chains. The movement of one of said bars 25 upward out of the group will naturally shift or toss the mass of ears of corn which may lie in the lower end of the chute, and the result is that the latter cannot become clogged. Such upward movement of the bars 25 not only agitates the accumulated mass of ears, but moves those ears upward which happen to lie in front of it, and therefore the action of each bar serves to assist in the forward and upward feed of the ears which is accomplished by the chain and its pins. The latter may be disposed upon occasional links at intervals as required by the size of the ears being handled, but this detail and others must be left to the manufacturer and user, and I reserve the right to make such changes as come within the spirit of the present invention.

What is claimed as new is:

1. In an agitator for feed chutes, the combination with the trunk whose bottom has a series of grooves and whose lower end has an opening across the lower ends of said grooves; of a series of chains moving upward through the opening and along said groove and having pins rising from their links in staggered relation to each other, and a series of shifting bars pivotally supported at their upper ends from the lower end of the trunk and having their lower ends hanging in position to be struck by said pins, for the purpose set forth.

2. In an agitator for the feed chutes of corn shelling machines, the combination with an elevator; of a chute to which said elevator delivers, said chute having closed sides and lower end and a corrugated bottom, and said lower end having an opening opposite the grooves in said corrugations, sprocket wheels across the extremities of said chute, endless chains passing around said wheels and along the grooves of the corrugations and having pins rising from their links in staggered relation to each other, a pivotal support carried by the trunk of the chute at its lower end, a series of collars thereon, and a series of shifting bars having eyes at their upper ends mounted on said support between said collars and flat bodies hanging from the eyes and adapted to be struck by said pins, for the purpose set forth.

In testimony whereof I have hereunto set my hand in presence of two subscribing witnesses.

NELS L. LARSON.

Witnesses:
S. H. NEEDLES,
S. H. COLEMAN.

---

Copies of this patent may be obtained for five cents each, by addressing the "Commissioner of Patents, Washington, D. C."